United States Patent [19]

Hayashi et al.

[11] Patent Number: 4,626,038
[45] Date of Patent: Dec. 2, 1986

[54] FLUID BRAKE SYSTEM FOR A MOTORCYCLE

[75] Inventors: Tsutomu Hayashi, Tokyo; Hidehiko Inoue, Saitama, both of Japan

[73] Assignee: Honda Giken Kogyo Kabushiki Kaisha, Tokyo, Japan

[21] Appl. No.: 468,962

[22] Filed: Feb. 23, 1983

[30] Foreign Application Priority Data

Feb. 25, 1982 [JP] Japan .................... 57-29330
Feb. 25, 1982 [JP] Japan ................ 57-26233[U]

[51] Int. Cl.$^4$ ............................................. B60T 13/00
[52] U.S. Cl. ..................................... 303/6 C; 303/91; 303/113
[58] Field of Search ............... 188/349; 303/6 R, 6 C, 303/95, 92, 100, 91, 101, 113, 22 R; 137/530, 505.18, 505.41

[56] References Cited

U.S. PATENT DOCUMENTS

| | | | |
|---|---|---|---|
| 2,356,556 | 8/1944 | Anderson | 137/505.41 |
| 2,735,669 | 2/1956 | Sciler | 137/505.41 |
| 3,312,062 | 4/1967 | MacDuff | 60/562 |
| 3,576,350 | 8/1968 | Larsen | 303/22 R |
| 3,650,573 | 3/1972 | Inada et al. | 303/22 R |
| 3,818,706 | 6/1974 | Gaiser | 60/562 |
| 3,825,308 | 7/1974 | Kasselmann et al. | 303/6 C |
| 3,838,887 | 10/1974 | Stelzer | 188/349 |
| 4,176,886 | 12/1979 | Watanabe | 303/6 A |
| 4,312,543 | 1/1980 | Kubota | 303/6 C |
| 4,441,590 | 4/1984 | Giorgetti | 303/6 C |
| 4,453,778 | 6/1984 | Smith et al. | 303/22 R |

*Primary Examiner*—Bruce H. Stoner, Jr.
*Assistant Examiner*—Alvin Oberley
*Attorney, Agent, or Firm*—Lyon & Lyon

[57] ABSTRACT

A braking system for a motorcycle employing a multi-piston fluid cylinder arranged in series to provide stepped braking from a single input to both the front and rear wheels. Additionally, a proportional pressure reduction valve operates to reduce the proportional braking pressure to the rear wheel of the motorcycle above a threshold or break point pressure level. An anti-locking system is employed with the front braking system. This anti-locking mechanism includes a warning buzzer and light simultaneously activated and deactivated with the anti-locking mechanism. A control mechanism including a control rod having stepped surfaces is employed to increase the threshold pressure of the proportional pressure reduction valve. The control mechanism disables the warning buzzer and the anti-locking mechanism and generates a continuous warning light signal.

11 Claims, 6 Drawing Figures

FLUID BRAKE SYSTEM FOR A MOTORCYCLE

BACKGROUND OF THE INVENTION

The field of the present invention is motorcycle fluid braking systems having commonly actuated front and rear brakes.

Systems have been developed for motorcycle brakes wherein the front wheel and the rear wheel are simultaneously braked in conjunction with each other by the operation of either one or both of a first brake element employing a brake lever which is hand operated and a second brake element employing a brake pedal which is foot operated. Such a system has included an anti-locking mechanism provided at least with the front wheel to prevent locking of the front wheel. A proportional pressure reduction valve has been employed in the fluid system between the source of the braking fluid pressure and the rear brake. Such a proportional pressure reduction valve provides for appropriate relative distribution of the brake power to the front and rear wheels. In this way, braking efficiency is improved.

In spite of the braking efficiency associated with such a system, the load on the motorcycle or the selective disabling or failure of the anti-lock system can result in a change in what is the most efficient relative brake power to the front and rear wheels. For example, with a second rider, greater braking efficiency is achieved with a higher proportion of the braking power on the rear wheel. This is also true for a system with a selectively disabled or broken anti-locking system. Motor vehicles have employed complicated mechanisms for accommodating conditions of load and the like through variable set pressure values in proportional pressure reduction valves. However, such systems are complex and unsuited for motorcycles.

SUMMARY OF THE INVENTION

The present invention is directed to a brake system for a motorcycle of the type having the brakes for the front and rear wheels controlled by a common actuating mechanism. The present invention is directed to a system by which the proportional distribution of brake power to the front and rear wheels is selectively variable to accommodate additional loads, disablement of an anti-locking mechanism, or road or surface conditions at the discretion of the operator. By such a system, the braking power may be shifted to increase that to the rear wheel to avoid front wheel lock prior to rear wheel lock. In this way, braking efficiency is improved under such conditions. Additionally, the shifter may disable the antilocking mechanism in light of a reduced proportion of pressure to the front brake.

Accordingly, it is an object of the present invention to provide an improved braking system providing additional braking efficiency under varied conditions. Other and further objects and advantages will appear hereinafter.

DETAILED DESCRIPTION OF THE PREFERRED EMBODIMENT

Figure 1:
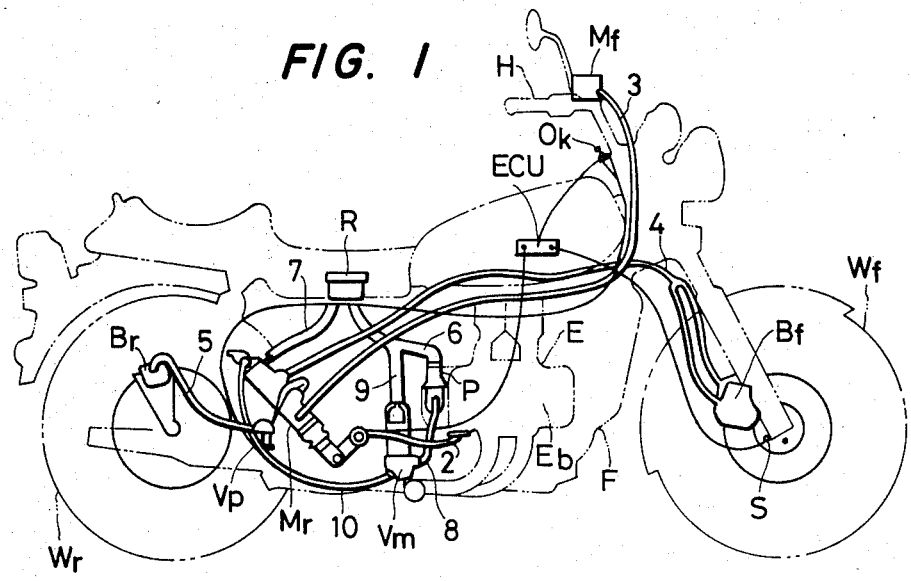
FIG. 1 is a side view of a motorcycle incorporating the present invention.
Figure 2:
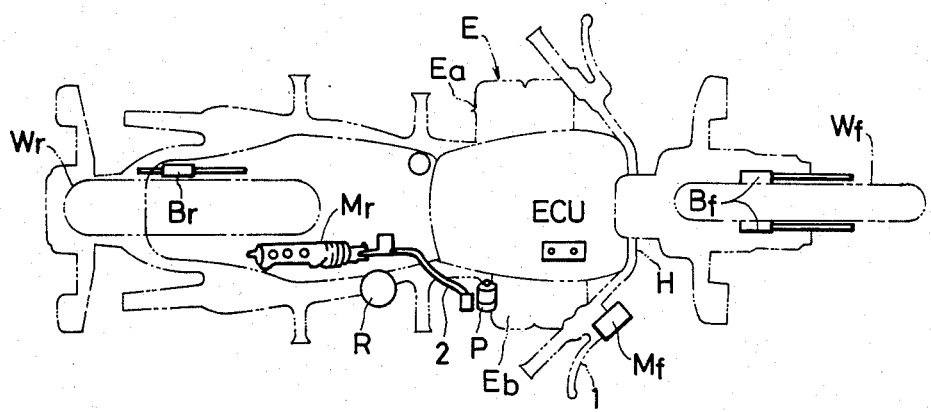
FIG. 2 is a plan view of a motorcycle incorporating the present invention.

A motorcycle is illustrated in FIGS. 1 and 2 incorporating a fluid brake system. The motorcycle is provided with a brake lever 1 as a first braking operation element. The brake lever 1 is operated by hand to actuate a front cylinder Mf which is actuated thereby. The brake lever 1 and front cylinder Mf are located on a handle H of the motorcycle. A brake pedal 2 is provided as a second braking operation element. The brake pedal 2 is operated by foot and is mechanically coupled to a master cylinder Mr as a brake fluid pressure generating means. The master cylinder Mr may receive braking input from either one of the brake pedal 2 and the brake lever 1. The output fluid pressure of the front cylinder Mf is supplied by way of a fluid line 3 to the master cylinder Mr resulting from actuation of the brake lever 1.

A pair of right and left fluid pressure brakes Bf for braking the front wheel Wf are connected via a fluid line 4 to the master cylinder Mr. A single fluid pressure brake Br for braking the rear wheel is connected via a fluid path 5 to the master cylinder Mr. In the fluid path 5, there is disposed a proportional pressure reduction valve Vp which proportionally reduces the fluid pressure transmitted to the rear brake Br when the fluid pressure from the master cylinder exceeds a certain value. This proportional pressure reduction valve Vp is capable of varying the fixed pressure at which the valve becomes operative. A detailed explanation of the proportional pressure reduction valve will be given later.

The motorcycle includes a horizontally opposed engine E which is mounted centrally on a body F between the front wheel Wf and the rear wheel Wr. A fluid pressure pump P, which in the preferred embodiment is an oil pump, is driven by the engine E. The pressure pump P is conveniently located behind the engine block Eb, the engine block Eb being displaced somewhat forward of the engine block Ea on the opposite side of the engine E. At the back of the oil pressure pump P, there is provided a control valve Vm of an anti-locking means for controlling the master cylinder Mr during braking. The anti-locking means automatically reduces the braking power of the front wheel brake Wf under conditions when the front wheel is locking during braking.

A reservoir R is provided on the side of the motorcycle body F at a central upper position as can be seen in FIGS. 1 and 2. The reservoir R is connected to the fluid pressure pump P and the master cylinder Mr by way of the lines 6 and 7, respectively. The control valve Vm of the anti-locking mechanism is interposed between the fluid lines 8 and 9 for connection to the fluid pressure pump P and the reservoir R and a fluid line 10 for connecting to the master cylinder Mr.

Figure 3:
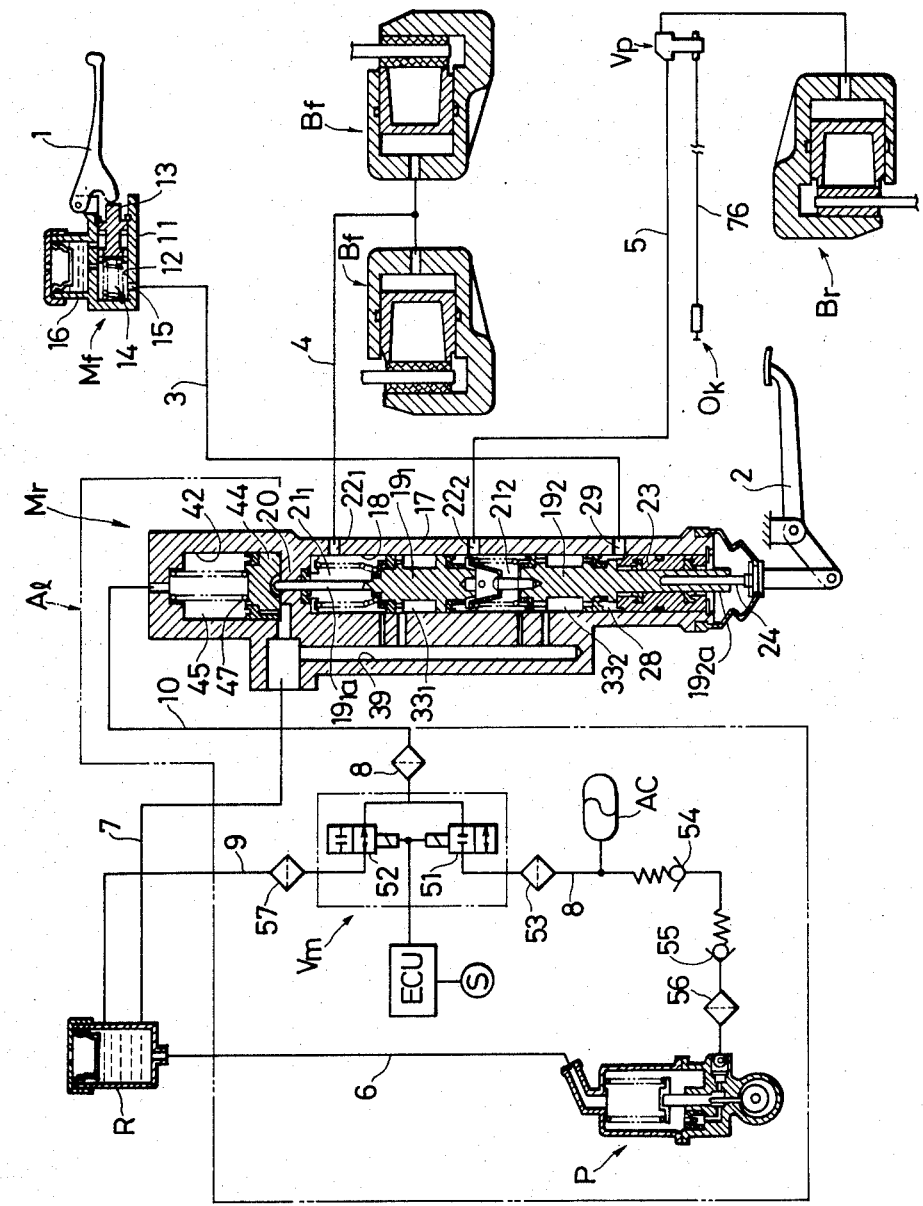
FIG. 3 is a schematic illustration of a braking system of the present invention.
Figure 4:
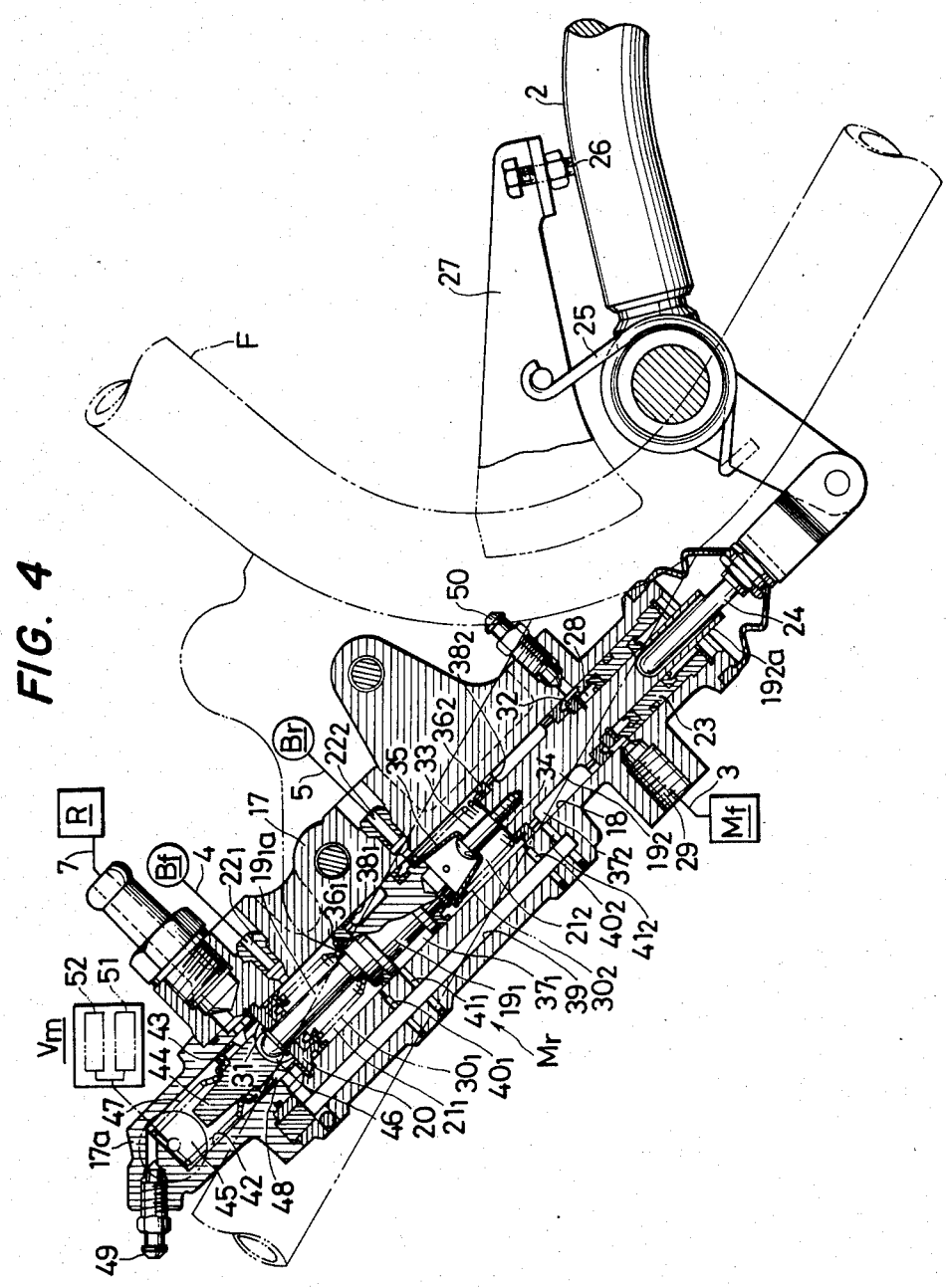
FIG. 4 is a cross-sectional side view of a brake actuating mechanism of the present invention.

Looking next to FIGS. 3 and 4, the front cylinder Mf is a conventional single cylinder. A piston 13 is moved by the brake lever 1 to slide within a cylinder bore 12 in a cylinder body 11. The actuation of the piston 13 results in a output of fluid pressure from the pressure chamber 14 through a port 15. The output port 15 is connected to the fluid line 3 which in turn communicates with the master cylinder Mr. Therefore, if the brake lever 1 is operated to move the piston 13 forward, fluid pressure is generated in the chamber 14 such that the pressure is supplied via the output port 15 and the fluid line 3 to the master cylinder Mr. A reservoir 16 supplies a source of fluid for the oil pressure chamber 14.

The master cylinder Mr is of the tandem type. Slidably mounted in a cylinder bore 18 defined within a cylinder body 17 is a first brake pistons $19_1$ and a second brake piston $19_2$ arranged in series. Defined within the cylinder bore 18 is a first braking fluid pressure chamber $21_1$ located between the first brake piston $19_1$ and a fixed bulkhead 20 extending across the cylinder bore 18. A second braking fluid pressure chamber $21_2$ is found within the cylinder bore 18 between the brake piston $19_1$ and $19_2$. The first braking fluid pressure chamber $21_1$ thus defined includes a first output port $22_1$. The second braking fluid pressure chamber $21_2$ includes a second output port $22_2$ extending through the side wall of the cylinder body 17. The fluid line 4 communicating with the front wheel brake Bf is connected to the first output port $22_1$. The fluid line 5 communicating with the rear wheel brake Br is connected to the second output port $22_2$.

The second brake piston $19_2$ includes a piston rod $19_{2a}$ which slidably passes through a sleeve 23 to extend from the lower end of the cylinder bore 18. The piston rod $19_{2a}$ is connected to the brake pedal 2 through a push rod 24. As a result, if the brake pedal 2 is actuated, the second brake piston $19_2$ is advanced within the cylinder bore 18. The brake pedal 2 is returned by means of a return spring 25. The retracted limits of the second brake piston $19_2$ is adjustably limited by means of a stopper bolt 26 which is located in a bracket 27 extending from the body F.

The cylinder bore 18, the second brake piston $19_2$ and the sleeve 23 form a fluid pressure chamber 28 thereamong. The above-mentioned fluid line 3 communicating with the front cylinder Mf is connected to an input port 29. The input port 29 is open at one side of the oil pressure chamber 28.

The first and second braking fluid pressure chambers $21_1$ and $21_2$ respectively include first and second return springs $30_1$ and $30_2$ positioned therein. The return springs $30_1$ and $30_2$ operate to bias the first and second brake pistons $19_1$ and $19_2$ toward the retracted position. The biasing force of the second return spring $30_2$ is established to be small in comparison with that of the first return spring $30_1$. In order to fix the retracted limit of the first brake piston $19_1$, there is provided a stop 31 fixed at one end of the piston rod $19_{1a}$. The piston rod $19_{1a}$ slidably extends through the bulkhead 20 and the stop 31 abutts against the bulkhead 20 at the selected end of the piston stroke. A stop 32 mounted on the piston rod $19_{2a}$ of the second brake piston $19_2$ limits travel of the piston $19_2$ by abutting the sleeve 23 within the cylinder bore 18.

The second return spring $30_2$ is located in the second braking fluid pressure chamber $21_2$ compressed between a washer plate 34 fixed by means of a bolt 33 at the upper end of the second brake piston $19_2$ and a moveable, cup-shaped washer plate 35 which is slidable on the bolt 33 within a restricted stroke range. This washer plate 35 is substantially in contact with the lower end of the first brake piston 19, with the brake pistons $19_1$ and $19_2$ in the retracted position. At this point, the moveable washer plate 35 is at its most distant point from the fixed washer plate 34.

Piston cups $36_1$ and $36_2$ are provided at the upper ends of the first and second brake pistons $19_1$ and $19_2$ respectively. The brake pistons $19_1$ and $19_2$ are reduced in diameter through the midportions thereof to define, with the cylinder wall 18, oil supply chambers $37_1$ and $37_2$. Holes $38_1$ and $38_2$ provide communication between the fluid supply chambers $37_1$ and $37_2$ and the areas behind the piston cups $36_1$ and $36_2$ through the brake pistons $19_1$ and $19_2$.

In the cylinder body 17 a fluid path 39 extends parallel to the cylinder bore 18. This fluid path 39 is in communication with the fluid line 7 which in turn communicates with the reservoir R. The supply ports $41_1$ and $41_2$ are always open to the fluid supply chambers $37_1$ and $37_2$. The relief ports $40_1$ and $40_2$ open into the first and second brake fluid pressure chambers $21_1$ and $21_2$ and the brake pistons $19_1$ and $19_2$ are positioned at the retracted limits thereof.

In a cylinder cap 17a forming the upper end portion of the cylinder body 17, there is formed a cylinder bore 42 which is arranged coaxially with the cylinder bore 18. The bulk head 20 is between the cylinder bore 18 and the cylinder bore 42 of the cylinder cap 17a. A control piston 44 is slidably disposed in the cylinder bore 42 and is provided with a piston cup 43 at the front surface thereof. Hence, the piston 44 is opposite to the end of the piston rod $19_{1a}$ of the first brake piston $19_1$. The control piston 44 separates the cylinder bore 42 into an upper control fluid pressure chamber 45 and a lower supply fluid chamber 46 and is usually retained at the retracted limit position such that it is in contact with the bulkhead 20. The control piston 44 is biased to this retracted position by a return spring 47 disposed in compression in the control fluid pressure chamber 45.

The supply fluid chamber 46 communicates with the reservoir R via the fluid path 39 in a similar way to that of the supply fluid chambers $37_1$ and $37_2$ described above. A fluid supply hole 48 for correcting the supply fluid chamber 46 and the area behind the piston cap 43 is formed in the control piston 44. An air bleeder 49 which communicates with the control fluid pressure chamber 45 is positioned on the cylinder cap 17a. Another air bleeder 50 which communicates with the fluid pressure chamber 28 of the second control piston $19_2$ is provided at the sidewall of the cylinder.

The anti-locking means A1 includes the aforementioned control piston 44 and the control valve means Vm which is composed of an electromagnetic control valve 51 and an electromagnetic control valve 52. The valve 51 is usually closed while the valve 52 is usually open for controlling the operation of the control piston 44. The anti-locking means further includes a pressure storing means AC for storing an operative fluid pressure of the control piston 44 and the fluid pressure pump P. The pump P supplies fluid pressure to the pressure storage means AC.

One of the connecting ports of the electromagnetic control valve 51 is connected to the fluid pressure pump P by way of the fluid path 8 which includes a filter 53, the pressure storing means AC, two check valves 54 and 55 and a filter 56. One of the connecting ports of the electromagnetic control valve 52 is connected to the reservoir R by way of the fluid path 9 in which is interposed a filter 57. The others of the connecting ports of both the control valves 51 and 52 are connected to the control fluid pressure chamber 45 of the rear master cylinder Mr by way of the common fluid path 10 in which a filter 8 is positioned. A detection signal from a front wheel speed sensor S provided on a first wheel Wf is processed at an electronic control unit ECU. The control unit ECU in turn controls the valve 51 and 52. Thus, control input to both control valves 51 and 52 is realized.

Figure 5:
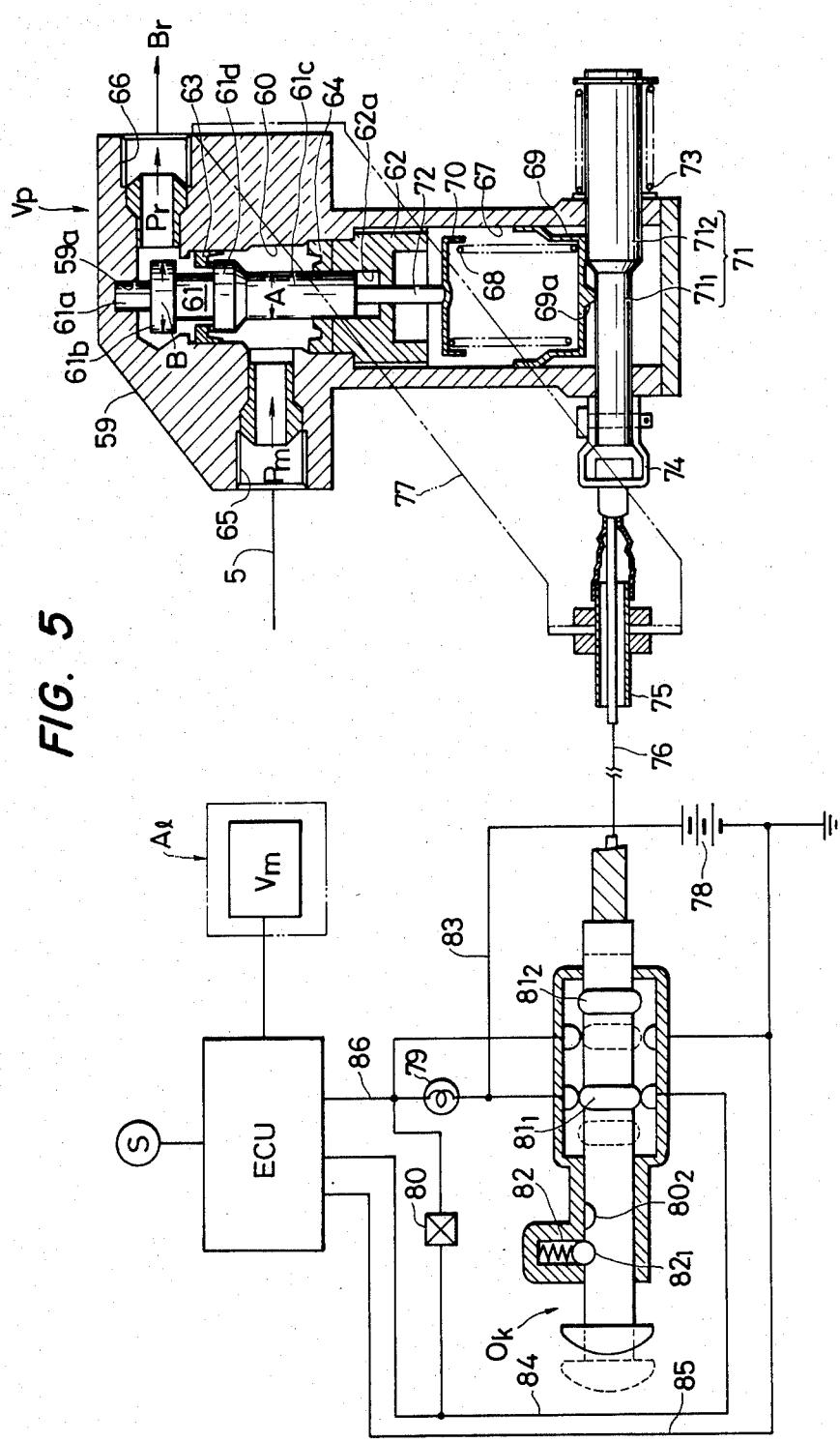
FIG. 5 is a schematic illustration of a proportional pressure reduction valve of the present invention illustrated in section.

FIG. 5 illustrates the porportional pressure reduction valve Vp in detail. This device is interposed in the fluid path 5 by way of which the second output port $22_2$ of the rear master cylinder Mr communicates with the rear wheel brake Br. An operation knob Ok associated with the valve Vp is also illustrated. In the porportional pressure reduction valve Vp, a plunger 61 is constructed to include an upper support shaft 61a, a valve head 61b of a cross-sectional area B and a valve stem 61c of a cross-sectional area A together with a flange 61d which is provided at the midpoint of the valve stem 61 in a valve hole 60 of the body 59. The Area A is small by comparison with the cross-sectional area of B of the valve head 61b. This plunger 61 is supported in such a way that the upper shaft 61a is fitted into a support hole 59a which is formed in the body 59. The lower portion or stem 61c of the plunger 61 is fitted into an inner hole 62a of a plug 62 which is screwed into the lower portion of a valve hole 60. In this mounting, the plunger may stroke up and down.

In the valve hole 60 there is mounted a lip seal 63 at the middle portion between the flange 61d and the valve head 61b of the plunger 61. There is interposed a cup seal 64 which is retained on the upper surface of the plug 62 at the lower portion of the valve stem 61c so as to create an air-tight seal between the valve hole 60 and an inner hole 62a in the plug 62. In addition, an input fluid pressure inlet 65 is open at a position in alignment with a valve stem 61c in the valve hole 60 and connected to the second output port $22_2$ of the rear master cylinder Mr by way of the fluid path 5. An output fluid pressure outlet 66 is open at the upper portion of the valve hole 60 and connected to the rear wheel brake Br.

A control spring chamber 67 is formed in the lower portion of the body 59. In this control spring chamber 67, there is a control spring 68 in compression between a spring holder 69 and a spring retainer 70. The lower surface of the spring holder 69 is in engagement with the side surface of a control rod 71 which is horizontally disposed through a lower portion of the control spring chamber 67 via a projection 69a. The control spring 68 biases the plunger 61 in the upward direction via a push rod 72 which is passed through the plug 62 in such a way as to be in contact with the upper surface of the spring retainer 70. The control rod 71 is provided with a small diameter portion $71_1$ and a large diameter portion $71_2$. The device is arranged such that the small diameter portion $71_1$ normally engages the projection 69a of the spring holder 69 by a rod spring 73. The end of the small diameter portion $71_1$ of the control rod 71 is in engagement with one end of a control wire 76. The control wire 76 is passed through a flexible tube 75 via a metal fitting 74. The other end of the control wire 76 is connected to the end of the operation knob Ok which is provided adjacent the handlebars H. The schematic outline 77 in FIG. 5 denotes a metal fitting for fixing the end of the flexible tube 75 onto the body 59 of the porportional pressure reduction valve Vp.

The operation knob Ok may be actuated in such a way as to switch the control member or rod 71. Furthermore, the electronic control unit ECU, which controls the anti-locking means A1, an alarm lamp 79, a first switch $81_1$ and a second switch $81_2$ connected to a circuit of an alarm buzzer 80 is enabled or disabled by the control knob Ok. The small diameter portion $71_1$ of the control rod 71 engages the projection 69a of the spring holder 69 when a click ball 82 is in the operation knob Ok at a first groove $82_1$. With the operation knob in this first position, a first setting load is given to the control spring 68 to give a first threshold set pressure to the valve Vp, the first switch $81_1$ is switched on and the second switch $81_2$ is switched off. At the same time, electric power is supplied to the electronic control unit ECU from the electric power source 78 by way of the circuit 83. The first switch $81_1$, the circuit 84 and the circuit 85 also receive power to operate the anti-locking means A1.

If the anti-locking means A1 is broken, a signal is developed from the electronic control unit by way of the circuit 86 so that the alarm lamp 79 goes on and off and the alarm buzzer 80 generates an intermediate signal sound when the operation knob Ok is in this first position.

If the operation knob Ok is pulled to a position such that the click ball 82 moves into the second groove $82_2$, the large diameter portion $71_2$ of the control rod 71 engages the projection 69a of the spring holder 69. The control spring 68 is compressed under such conditions so that a second setting load is provided and in turn a second threshold set pressure to the valve Vp. With the operation knob Ok in this second location, the first switch $81_1$ is switched off and the second switch $81_2$ is switched on. The circuits 83 and 84 of the electric power source 78 of the electronic control unit ECU is cut off so that the anti-locking means A1 is released. Under this condition, the alarm buzzer 80 is disabled and does not generate a signal. The alarm lamp 78 is grounded by the second switch $81_2$ so that it is turned on continuously. The continuous light indicates that the proportional pressure reduction valve Vp is at the second set pressure value. Thus, the control knob Ok in conjunction with the control rod 71 provide means for both disabling the anti-locking mechanism and selecting the threshold set pressure of the valve Vp.

In further explanation of the function of the brake in accordance with the present invention, the front master cylinder Mf is actuated by the brake lever 1 in FIG. 3 and FIG. 4. The fluid pressure generated in the fluid pressure chamber 14 is then supplied as an input into the fluid pressure chamber 28 of the rear master cylinder Mr from the input port 29 by way of the fluid path 3. The second brake piston $19_2$ is thus pushed upwards by the fluid pressure. If the brake pedal 2 is stepped on, the force of this action is mechanically transmitted as an input to the second brake piston $19_2$ via the push rod 24, and the second brake piston $19_2$ is again pushed upward. Therefore, if the brake lever 1 and the brake pedal 2 are simultaneously operated, the sum of the pushing force due to the output pressure of the front master cylinder Mf and the pushing force of the push rod 24 is applied as a control input to the second brake piston $19_2$.

If the second brake piston $19_2$ is pushed upwards, the first and second brake pistons $19_1$ and $19_2$ advance while compressing the first and second return springs $30_1$ and $30_2$. The piston cups $36_1$ and $36_2$ of the pistons pass the relief ports $40_1$ and $40_2$. Once having passed the relief ports, the pistons generate fluid pressures in the first and second brake fluid pressure chambers $21_1$ and $21_2$ in accordance with the amounts of advance of the brake pistons $19_1$ and $19_2$.

The fluid pressure which is generated in the first brake fluid pressure chamber $21_1$ is transmitted from the first output port $22_1$ to the front wheel brake Bf by way of the fluid path 4 so as to actuate the front wheel brake Bf. The fluid pressure which is generated in the second brake fluid pressure chamber $21_2$ is transmitted from the second output port $22_2$ to the rear wheel brake Br by way of the fluid path 5 so as to actuate the rear wheel brake Br. Hence, brake power is applied to the front and rear wheels Wf and Wr, respectively.

With the setting load of the second return spring $30_2$ small in comparison with that of the first return spring $30_1$, the second return spring $30_2$ is compressed as the second brake piston $19_2$ is initially moved. Thus, the first brake piston does not initially advance. The fluid pressure generated before the advancement of the first brake piston is, therefore, in the brake fluid pressure chamber $21_2$. After the fluid pressure has reached a fixed value $P_1$, the first return spring $30_1$ is compressed, so that the first brake piston $19_1$ starts to advance. The advancement of the first brake piston $19_1$ generates a fluid pressure in the first brake fluid pressure chamber $21_1$.

The proportional pressure reduction valve Vp in the oil path 5 between the output ports $22_2$ of the second brake fluid pressure chamber $21_2$ and the rear wheel brake Br affects the fluid pressure to the rear wheel brake Br. The output fluid pressure of the second output port $22_2$ increases until it is equal to or higher than the predetermined value $P_2$. At this time, the output fluid pressure is reduced by a constant rate by the function of the proportional pressure reduction valve Vp to thereby proportionally reduce the braking force to the rear wheel.

Turning then to FIG. 5, the input fluid pressure to the valve Vp is supplied as an input Pm from the fluid pressure inlet 65. An output fluid pressure Pr is supplied to the output 66. The first setting load F of the control spring 68 is determined by the projection 69a of the spring holder 69 engaging the small diameter portion $71_1$ of the central rod 71. When the cross-sectional area A of the valve stem 61c is smaller than the cross-sectional area of the valve head 61b, then the plunger 61 is pushed upward by the control spring 68 when the pressure Pm times the area A is less than the spring force F. Under this condition, the operative fluid is able to freely flow through the gap between the plunger 61 and the valve hole 60 from the input side to the output side of the valve. With such flow, the pressure of the input fluid comes to be equal to the pressure of the output fluid.

As the input fluid pressure Pm continues to increase, the force resulting from the input pressure Pm acting on the area A becomes greater than the spring force F. At this time, the plunger 61 is lowered to compress the control spring 68 until the valve head 61b comes into contact with the lip seal 63. In this way, input flow is cut off to the output. The output pressure then comes to be a proportion of the input pressure as follows:

$$Pr.B = Pm(B-A) + F$$

If the input fluid pressure increases by any amount, the plunger is displaced upwards to create a gap between the valve head 61b and the lip seal 63. As the increased oil pressure is transmitted to the output side, the gap is again reduced such that the valve head 61b engages the lip seal 63. Again, equilibrium is established and the output pressure is increased proportionally to the input pressure. The condition when the plunger 61 first starts to lower against the force of the spring is called the "break point" and the ratio of the effective areas, $(B-A)/B$, is called the "pressure reduction ratio". The input oil pressure Pm is reduced by a constant ratio with respect to the cross-sectional area A of the valve stem 61c and the cross-sectional area B of the valve head 61b so as to generate the proportional output oil pressure Pr. At the same time, the fluid path 4 between the output port $22_1$ of the first control oil pressure chamber $21_1$ and the front wheel brake Bf is always open and the output fluid pressure of the first output port $22_1$ is thereby transmitted to the front wheel brake Bf without reduction.

Figure 6:
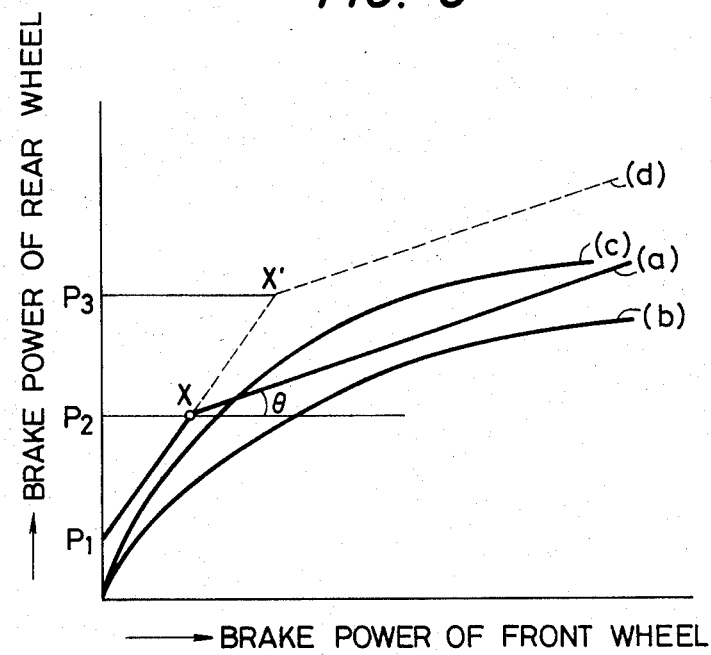
FIG. 6 is a graph illustrating proportional brake power between the front and rear wheels.

Turning to FIG. 6, a graph illustrates the distribution characteristic of the brake power of the front wheel versus the rear wheel. The solid line (a) denotes an actual distribution line of the brake power to the front wheel versus the rear wheel in accordance with the above-mentioned brake actuation. The brake power works on the rear wheel only until the fluid pressure of the second brake fluid pressure chamber $21_2$ reaches a fixed value $P_1$. If the fluid pressure becomes higher than the fixed value $P_1$, the brake power also works on the front wheel. In addition, if the fluid pressure Pm of the second brake fluid pressure chamber $21_2$ becomes higher than the first set pressure value $P_2$ of the proportional pressure reduction valve Vp, the slope of the distribution line (a) becomes discontinuous at the break point (x). At higher pressures, the proportional braking distribution becomes less, illustrating that the brake power to the rear wheel is reduced by a constant ratio. The solid line (b) in the graph denotes an ideal distribution line of the brake power of the front wheel versus the rear wheel at a time when one person rides on the motorcycle. The solid line (a) is similar to the ideal distribution line (b) of the brake power to obtain the most stable braking efficiency. Indeed, stability is enhanced because the brake power to the rear wheel is greater than that of the ideal distribution line (b).

Although the control piston 44 also moves upwards via the piston rod $19_{1a}$ of the first brake piston $19_1$ as the first brake piston $19_1$ is moved upward at the time of braking, the operative fluid in the brake fluid pressure chamber 45 is exhausted to the side of the reservoir R. Because the control fluid pressure chamber 45 communicates with the reservoir R through the control valve 52, the control fluid pressure chamber 45 provides little resistance to the brake input.

If the front wheel Wf starts to lock at the time of braking, the electronic control unit ECU quickly senses this state, for example, by a signal generated from the front wheel speed sensor S. A signal is then sent opening the normally closed control valve 51 and closing the normally open control valve 52. When this action takes place, the fluid path 8 is opened and the fluid path 9 is interrupted so that the pressure fluid stored in the pressure storing means AC is supplied to the control fluid pressure chamber 45 through fluid path 8. The control piston 44 then moves the first brake piston $19_1$ back a small amount against the brake input. This reduces the pressure on the first brake fluid pressure chamber $21_1$. As a result, the brake power of the front brake Bf is reduced thereby avoiding the locking phenomenon of the front wheel Wf.

Once the brake power is appropriately reduced, the electronic control unit ECU senses the changed state and returns both the control valves 51 and 52 to the usual positions and reduces the pressure in the control oil pressure chamber 45. At this point, the brake power of the front wheel is fully restored. As the foregoing action is repeated at high speed, it is possible that the front wheel Wf is efficiently braked without causing the wheel to lock. Although the retraction of the first brake piston $19_1$ due to the actuation of the anti-skid mechanism brings about an increase of pressure in the second brake fluid pressure chamber $21_2$, the increase of pressure is absorbed by the elastic deformation of the various parts of the fluid pressure system of the rear wheel brake Br because that increase in pressure is instantaneous. Therefore, accurate control of the brake lever 1 and the brake pedal 2 is maintained. With the foregoing system, the brake power to the rear wheel brake is freely adjusted by increasing or decreasing the brake input to the second brake piston $19_2$ even when the anti-locking means A1 controls the brake power of the front wheel brake Bf.

If the brake lever 1 and the brake pedal 2 are released in order to release the braking of the front wheel Wf and the rear wheel Wr, the first and second brake pistons $19_1$ and $19_2$ return by the elastic force of the first and second return springs $30_1$ and $30_2$. When this occurs, the pressure in the first and second brake fluid pressure chambers $21_1$ and $21_2$ may be reduced to become equal to or lower than atmospheric pressure. The outer peripheral parts of the piston cups $36_1$ and $36_2$ are recessed relative to the sides of the brake fluid pressure chambers $21_1$ and $21_2$ due to the pressure differences between the reduced pressures and the pressures in the supply fluid chambers $37_1$ and $37_2$. The result is that gaps are formed between the outer peripheral parts and the inner wall of the cylinder bore 18. Hence, fluid may be supplied from the supply fluid chambers $37_1$ and $37_2$ to the brake fluid pressure chambers $21_1$ and $21_2$ by way of the fluid supply holes $38_1$ and $38_2$. Any additional fluid supplied is normally returned from the relief ports $40_1$ and $40_2$ into the fluid path 7 and to the reservoir R. Thus, the fluid is supplied to the supply fluid chambers $37_1$ and $37_2$ via the fluid path 39 by way of the supply ports $41_1$ and $41_2$.

The fluid is supplied to the control fluid pressure chamber 45 from the supply fluid chamber 46 by way of the fluid supply hole 48 by the same operation as mentioned above when the brake piston 44 retracts. Thus, since the fluid circulates by way of the brake fluid pressure chamber 45, the fluid path 9, reservoir R, the fluid path 7, the supply fluid chamber 46, the fluid supply hole 48 and the control fluid pressure chamber 45, in particular, by the reciprocating motion of the control piston 44, it is possible to prevent bubbles from remaining in the control fluid pressure circuit.

The foregoing describes the condition when the anti-locking means A1 works or is not in any way disabled. This is the normal operating condition. Under this condition, the control rod 71 is positioned to provide a first setting load in the proportional pressure reduction valve Vp. The signal developed from the electronic control unit ECU by way of the circuit 86 causes the alarm lamp 79 to go on and off and the alarm buzzer 80 to generate an intermittant signal sound when the anti-locking mechanism is activated or repeatedly activated in performing its function. If the operator wishes to choose the second brake operating mode, he may pull the operation knob Ok to a position at which the click ball 84 is able to drop into the second groove $82_2$. At this time, the large diameter portion $71_2$ of the control rod $71_1$ engages the projection 69a of the spring holder 69 so that the control spring 68 is compressed and provided with the second setting load. Additionally, the circuitry is controlled such that the signal sound of the alarm buzzer 80 is disabled and the alarm lamp 79 is turned on to operate continuously. Thus, the anti-locking means A1 is disabled and there is indication of this fact by the alarm lamp 79.

Concurrent with the disabling of the anti-locking means, the control spring 68 of the proportional pressure reduction valve Vp is provided with the second setting load which is larger than the first setting load so that the plunger 61 does not lower to institute the proportional pressure differential to the rear braking system until a larger input fluid pressure Pm is supplied to the input of the proportional pressure reduction valve Vp. Consequently, the break point (x) of the distribution line (a) as shown in FIG. 6 goes up to a new value (x') at which the fluid pressure of the rear wheel brake Br becomes P3. From the break point (x') the distribution line of the brake power of the front wheel versus the rear wheel becomes proportional as shown by the dotted line (d). In effect, the distribution of the brake power of the rear wheel increases in comparison with the first operating mode where the anti-locking mechanism is enabled. In this way, additional stability afforded by proportionally higher braking of the rear wheel, particularly when the anti-locking means A1 is disabled, is realized. In the graph, a solid line (c) denotes an ideal distribution line of the brake power of the front wheel versus the rear wheel at the time when two people are riding on the motorcycle. Under such conditions, a larger brake power distribution to the rear wheel is advantageous. Therefore, even if the anti-locking means A1 is not broken, the actual brake power distribution line (d) is above the ideal brake power distribution line (c) at the time when two people ride on the motorcycle.

Thus, a simple construction for providing reasonable control over the proportional braking of a motorcycle with operation of both brakes conducted by a single lever or pedal is described. It is further noted and contemplated by the present invention that a multi-stepped control rod may be employed to allow even greater flexibility in the control of the proportional braking arrangement. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A fluid brake system for a motorcycle having front and rear brakes, a brake actuating mechanism constructed and arranged to simultaneously actuate both front and rear brakes and an anti-locking mechanism for the front brake, the improvement comprising a proportional pressure reduction valve between the brake actuating mechanism and the rear brake, said valve having selectable first and second threshold set pressures and a means for selecting said first and second threshold set pressures and for disabling said anti-locking mechanism when said second threshold set pressure is selected.

2. A fluid brake system for a motorcycle having front and rear brakes, a brake actuating mechanism constructed and arranged to simultaneously accuate both front and rear brakes and an anti-locking mechanism for the front brake, the improvement comprising a proportional pressure reduction valve between the brake actuating mechanism and the rear brake, said valve having selectable first and second threshold set pressures and a means for selecting said first and second threshold set pressures and for disabling said anti-locking mechanism when said second threshold set pressure is selected, said valve including a spring biasing said valve to the open position, said means including a control member and a movable spring holder, said control member having two positions in said valve and supporting said spring holder at each of said two positions.

3. The fluid brake system of claim 2 wherein said valve includes a valve body, a valve seat, and a plunger positioned in said valve body to operatively close against said seat, said spring biasing said plunger away from said seat.

4. A fluid brake system for a motorcycle having front and rear brakes, a brake actuating mechanism constructed and arranged to simultaneously actuate both front and rear brakes and an anti-locking mechanism for the front brake, the improvement comprising a proportional pressure reduction valve between the brake actuating mechanism and the rear brake, said valve having selectable first and second threshold set pressures and a means for selecting said first and second threshold set presures and for disabling said anti-locking mechanism when said second threshold set pressure is selected, said valve including a spring biasing said valve to the open position, said means including a control member and a movable spring holder, said control member having two positions in said valve supporting said spring holder.

5. The fluid brake system of claim 4 wherein said valve includes a valve body, valve seat, and a plunger positioned in said valve body to operatively close against said seat, said spring biasing said plunger away from said seat.

6. A fluid brake system for a motorcycle having front and rear brakes, a brake actuating mechanism constructed and arranged to simultaneously actuate both front and rear brakes and an anti-locking mechanism for the front brake, the improvement comprising a proportional pressure reduction valve between the brake actuating mechanism and the rear brake, said valve having selectable first and second threshold set pressures and a means for selecting said first and second threshold set pressures, said valve including a spring biasing said valve to the open position, said means including a control member and a movable spring holder, said control member having two positions in said valve and supporting said spring holder at each of said two positions, said valve including a valve body, a valve seat, and a plunger positioned in said valve body to operatively close against said seat, said spring biasing said plunger away from said seat, and said control member including a control rod having stepped surfaces selectively engaging said spring holder, said stepped surfaces being progressively nearer said plunger to increase compression in said spring.

7. A fluid brake system for a motorcycle having front and rear brakes, a brake actuating mechanism constructed and arranged to simultaneously actuate both front and rear brakes and an anti-locking mechanism for the front brake, the improvement comprising a proportional pressure reduction valve between the brake actuating mechanism and the rear brake, said valve having selectable first and second threshold set pressures and a means for selecting said first and second threshold set pressures and for disabling said anti-locking mechanism when said second threshold set pressure is selected, said valve including a spring biasing said valve to the open position, said means including a control member and a movable spring holder, said control member having two positions in said valve supporting said spring holder, and said valve including a valve body, a valve seat, and a plunger positioned in said valve body to operatively close against said seat, said spring biasing said plunger away from said seat and, said control member including a control rod having stepped surfaces selectively engaging said spring holder, said stepped surfaces beng progressively nearer said plunger to increase compression in said spring.

8. A fluid brake system for a motorcycle having front and rear brakes, a brake actuating mechanism constructed and arranged to simultaneously actuate both front and rear brakes and an anti-locking mechanism for the front brake, the improvement comprising a proportional pressure reduction valve between the brake actuating mechanism and the rear brake, said valve having selectable first and second threshold set pressures and a means for selecting said first and second threshold set pressures and for disabling said anti-locking mechanism when said second threshold set pressure is selected, said valve including a spring biasing said valve to the open position, said means including a control member and a movable spring holder, said control member having two positions in said valve supporting said spring holder and a warning light activated by said anti-locking mechanism, said means further including a switch to turn on said warning light independently of said anti-locking mechanism.

9. A hydraulic brake system for a motorcycle including a master hydraulic cylinder for operating a front and a rear brake comprising a pressure reduction means positioned between the master cylinder and the rear brake and control means operating said pressure reduction means to select the amount of pressure reduction to the rear brake from at least two predetermined pressures, and a brake anti-locking means to automatically reduce the hydraulic pressure to a front wheel brake, wherein said means to select the amount of pressure reduction includes means to disable said brake anti-locking means at least at one predetermined pressure.

10. The hydraulic brake system defined in claim 9 wherein said hydraulic master cylinder includes dual cylinder cavities having a first master cylinder cavity connected to the front brake and a second master cylinder cavity connected to the rear brake, said master cylinder including means to first cause hydraulic pressure to operate said rear brake from said master hydraulic cylinder, said means to select the amount of pressure reduction includes means to first operate said rear brake without pressure reduction.

11. The hydraulic brake system defined in claim 1 wherein said brake actuating mechanism includes means to operate in series the rear brake and the front brake, said means to select the amount of pressure reduction includes means to cooperate with said means to operate in series the rear brake and the front brake without pressure reduction.

* * * * *